(12) United States Patent
Cayre et al.

(10) Patent No.: US 7,721,545 B2
(45) Date of Patent: May 25, 2010

(54) DEVICE FOR INJECTING A MIXTURE OF AIR AND FUEL, COMBUSTION CHAMBER AND TURBOMACHINE BOTH EQUIPPED WITH SUCH A DEVICE

(75) Inventors: Alain Cayre, Pamfou (FR); Michel Andre Albert Desaulty, Vert St Denis (FR); Nicolas Pommier, Brunoy (FR)

(73) Assignee: SNECMA, Paris (FR)

( * ) Notice: Subject to any disclaimer, the term of this patent is extended or adjusted under 35 U.S.C. 154(b) by 535 days.

(21) Appl. No.: 11/692,441

(22) Filed: Mar. 28, 2007

(65) Prior Publication Data
US 2007/0227147 A1 Oct. 4, 2007

(30) Foreign Application Priority Data
Mar. 30, 2006 (FR) .................................. 06 02750

(51) Int. Cl.
*F23R 3/04* (2006.01)
(52) U.S. Cl. .......................................... 60/737; 60/752
(58) Field of Classification Search .................. 60/722, 60/737, 738, 752, 756, 796, 800
See application file for complete search history.

(56) References Cited

U.S. PATENT DOCUMENTS

| 5,941,076 A | * | 8/1999 | Sandelis | 60/752 |
| 5,956,955 A | * | 9/1999 | Schmid | 60/748 |
| 6,782,620 B2 | * | 8/2004 | Caldwell et al. | 29/890.01 |

FOREIGN PATENT DOCUMENTS

| EP | 1 158 246 A2 | 11/2001 |
| FR | 2 753 779 A1 | 3/1998 |

OTHER PUBLICATIONS

U.S. Appl. No. 11/768,556, filed Jun. 26, 2007, Cayre, et al.

* cited by examiner

*Primary Examiner*—Louis J Casaregola
(74) *Attorney, Agent, or Firm*—Oblon, Spivak, McClelland, Maier & Neustadt, L.L.P.

(57) ABSTRACT

The invention relates to a device for injecting a mixture of air and fuel into a combustion chamber of a turbomachine where the supply of air is improved. The invention relates more particularly to a new type of sliding bushing.

11 Claims, 7 Drawing Sheets

DEVICE FOR INJECTING A MIXTURE OF AIR AND FUEL, COMBUSTION CHAMBER AND TURBOMACHINE BOTH EQUIPPED WITH SUCH A DEVICE

BACKGROUND OF THE INVENTION

The invention applies to the field of turbomachines and relates to a device for injecting a mixture of air and fuel into a combustion chamber of a turbomachine.

It relates more precisely to a novel type of sliding bushing in which the supply of air for the air/fuel mixture is improved.

In the remainder of the description, the terms "upstream" and "downstream" will be used to denote the positions of the structural elements in relation to one another in the axial direction, taking the gas flow direction as reference point. Likewise, the terms "internal" or "radially internal" and "external" or "radially external" will be used to denote the positions of the structural elements in relation to one another in the radial direction, taking the axis of rotation of the turbomachine as reference point.

A turbomachine comprises one or more compressors which deliver pressurized air to a combustion chamber where the air is mixed with fuel and ignited so as to generate hot combustion gases. These gases flow downstream of the chamber toward one or more turbines which convert the energy thus received in order to rotate the compressor or compressors and provide the work required, for example, to power an aircraft.

DESCRIPTION OF THE PRIOR ART

Typically, as illustrated in FIG. 1, the combustion chambers 1 used in aeronautics comprise an internal wall 2 and an external wall 3 interconnected at their upstream end by a chamber endwall 4. The chamber endwall 4 has, spaced circumferentially, a plurality of openings each accommodating an injection device 10 which allows the mixture of air and fuel to be fed into the chamber.

FIG. 2 shows a sectioned view through an injection device 10 according to the prior art. The injection device 10, the axis of symmetry of revolution of which is denoted X, comprises, positioned from upstream to downstream, a sliding bushing 20 connected by an annular dish 30 to radial swirl inducers 40. The radial swirl inducers 40 comprise a venturi 50 and are connected by their downstream end to a bowl 60 that has a divergent conical wall. The bowl 60 is itself connected to the chamber endwall 4 by means of a deflector 70. The sliding bushing 20 comprises, positioned from upstream to downstream, an upstream wall 21 of convergent conical shape continuing into a cylindrical wall 24 which terminates downstream in a flange 23.

The combustion chamber 1 is supplied with liquid fuel mixed with air from a compressor. The liquid fuel is conveyed as far as the chamber by injectors 5. The downstream end 6, also known as the head, of the injectors 5 is positioned in the injection device 10, in the sliding bushing 20, in such a way that the axis of symmetry of the injector head 6 corresponds to the axis of symmetry of the sliding bushing. Thus, one of the functions of the sliding bushing 20 is to guide the injector into position and to provide the seal between this injector and the injection device 10. The function of guiding the injector is performed by the upstream wall 21 of the sliding bushing 20.

The air and fuel are mixed at the injection device 10, in several places. An initial mixing operation is performed at the sliding bushing 20. To do this, pressurized air is carried via drillings 22, also known as purge holes, into contact with the fuel leaving the injector 5. Thus, a spray of fuel is initiated, its formation continuing thereafter at the radial swirl inducers 40 and the bowl 60. The sliding bushing 20 therefore has as an additional function that of performing an initial mixing between the pressurized air and the fuel. The air which reaches the purge holes 22 allows control over the correct formation of the spray of fuel but also cools the injector head 6. The purge holes 22 are made on the flange 23 of the sliding bushing 20.

A third function of the sliding bushing 20 is to allow relative movement between the injector 5 and the combustion chamber 1 while at the same time maintaining sealing between the injector 5 and the injection device 10. This movement is associated with the manufacturing tolerances and with the differential expansions there are between the injector and the chamber. To this end, the connection between the sliding bushing 20 and the radial swirl inducers 40 is by means of a dish 30 which allows the sliding bushing to move by several millimeters in all the directions of the plane containing the flange 23.

The amount of air passing through the purge holes 22 is dependent in particular on their number and their diameter. The sizing of the purge holes 22 has an influence both on the total air flow passing through these holes and on the aerodynamic lock of the sliding bushing 20. Aerodynamic lock is defined by the following ratio:

$$\text{aerodynamic\_lock} = \frac{\text{number\_of\_holes\_22} \times \text{diameter\_of\_the\_holes\_22}}{\text{perimeter\_of\_the\_circle\_passing\_through\_the\_center\_of\_the\_holes\_22}}$$

For the same flow rate it is possible to obtain different values of aerodynamic lock and thus influence the formation of the spray of fuel. Specifically, this parameter has an influence on the penetration of the purge flow and on the level of interaction between the streams of air from the purge and from the swirl inducers. It plays a part in governing the size of the droplets and their distribution in the spray and the initial angle of the cone of fuel leaving the injector.

Since aerodynamic lock is proportional to the diameter of the purge holes 22 and since the air flow rate is proportional to the square of their diameter, it is possible to alter these two parameters differently to suit the specifics of the particular combustion chamber concerned.

If there is a desire to increase the air flow rate passing through the purge holes 22 then it is necessary to increase either their diameter or the number of them. Now, the increase in diameter of the holes 22 is limited by the travel of the sliding bushing 20 relative to the radial swirl inducers 40. In addition, increasing the number of holes 22 influences the aerodynamic lock, something which is not always desirable.

Another way to increase the flow rate is to increase the pressure of the air reaching the purge holes 22. However, in order to supply the holes 22, the air has to flow around the convergent wall 21 of the sliding bushing, and this gives rise to pressure drops and recirculation and therefore causes a loss of pressure and poor supply conditions.

One known way of addressing this problem, as illustrated in document FR 2753779, is to make the purge holes 22 in the cylindrical wall 24 of the sliding bushing so that their axis is parallel to the axis X of the injection device. The disadvantages of this solution are that the sliding bushing is then larger and that the holes are longer for the same diameter. This gives rise to a loss in energy experienced by the air as it passes through the purge holes, and gives rise to recirculation which is detrimental to the air flow rate.

SUMMARY OF THE INVENTION

The invention allows these problems to be solved by proposing an injection device comprising a sliding bushing arranged in such a way as to increase the air flow rate passing through the purge holes without being limited by the travel of the sliding bushing or by the impact on aerodynamic lock.

The invention also makes it possible to make the air flow rate passing through the purge holes independent of the geometry of the sliding bushing, for example independent of the length of the convergent upstream wall.

More specifically, the invention relates to a device for injecting a mixture of air and fuel into a combustion chamber of a turbomachine, the injection device having symmetry of revolution about an axis X and comprising, arranged from upstream to downstream in the direction in which the gases flow, a sliding bushing of axis of revolution Y connected to radial swirl inducers by a dish, an aerodynamic bowl spaced axially from the radial swirl inducers, the sliding bushing comprising a convergent conical upstream wall continuing into a cylindrical wall of axis X and a downstream flange extending radially at the downstream end of the cylindrical wall, the downstream flange being equipped with pressurized-air supply holes also known as purge holes, which device is notable in that the convergent upstream wall of the sliding bushing is equipped with at least one row of circumferentially-spaced additional pressurized-air supply orifices.

Advantageously, the additional supply orifices have a total passage cross section greater than or equal to the total passage cross section of the purge holes.

According to a number of embodiments, the additional supply orifices are of cylindrical shape with a directrix that is circular or oblong in shape or shaped as a quadrilateral.

The axis of the additional supply orifices may be parallel to the axis of the sliding bushing or alternatively may be orthogonal to the wall of the convergent upstream wall.

The invention finally relates to a turbomachine equipped with such a combustion chamber.

According to another embodiment of the invention, the additional supply orifices are positioned at the upstream end of the convergent upstream wall, have an open side and form scallops.

According to a variant of the invention, this invention relates to a device for injecting a mixture of air and fuel into a combustion chamber of a turbomachine, the injection device having symmetry of revolution about an axis X and comprising, arranged from upstream to downstream in the direction in which the gases flow, a sliding bushing of axis of revolution Y connected to radial swirl inducers by a dish, an aerodynamic bowl spaced axially from the radial swirl inducers, the sliding bushing comprising a convergent upstream wall continuing into a cylindrical wall of axis X and a downstream flange, the downstream flange being equipped with pressurized-air supply holes also known as purge holes, the device being notable in that the purge holes have different inlet and outlet diameters, the inlet diameter being greater than the outlet diameter.

Advantageously, the invention also relates to a combination of the different embodiment variants, in particular, the sliding bushing may have both additional supply orifices or scallops and purge holes with different inlet (26) and outlet (27) diameters, the inlet diameter (26) being greater than the outlet diameter (27).

The invention also relates to a combustion chamber and a turbomachine equipped with an injection device according to the invention.

BRIEF DESCRIPTION OF THE DRAWINGS

The invention will be better understood and other advantages thereof will become more clearly apparent in the light of the description of some preferred embodiments which is given by way of nonlimiting example and makes reference to the attached drawings in which.

The same references will be kept throughout the description to denote parts or details which are similar from one figure to another.

Figure 1:
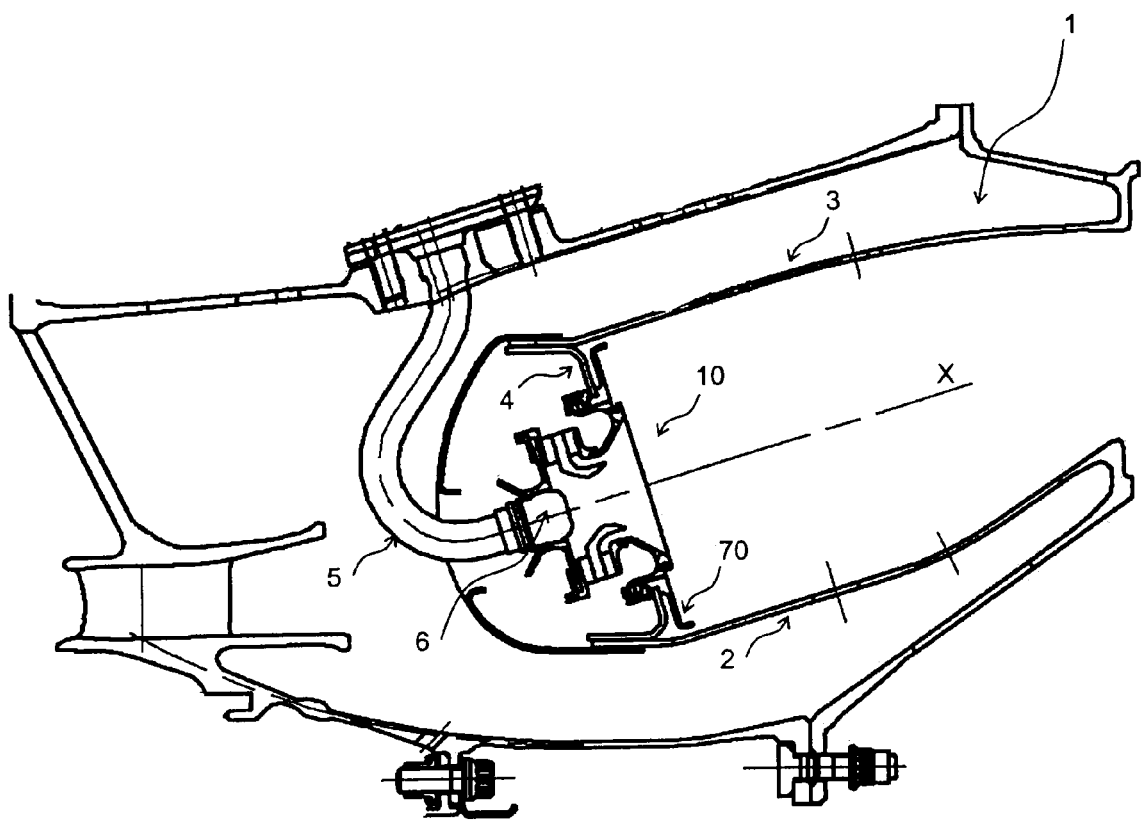
FIG. 1 is a schematic sectioned view of a combustion chamber according to the prior art.
Figure 2:
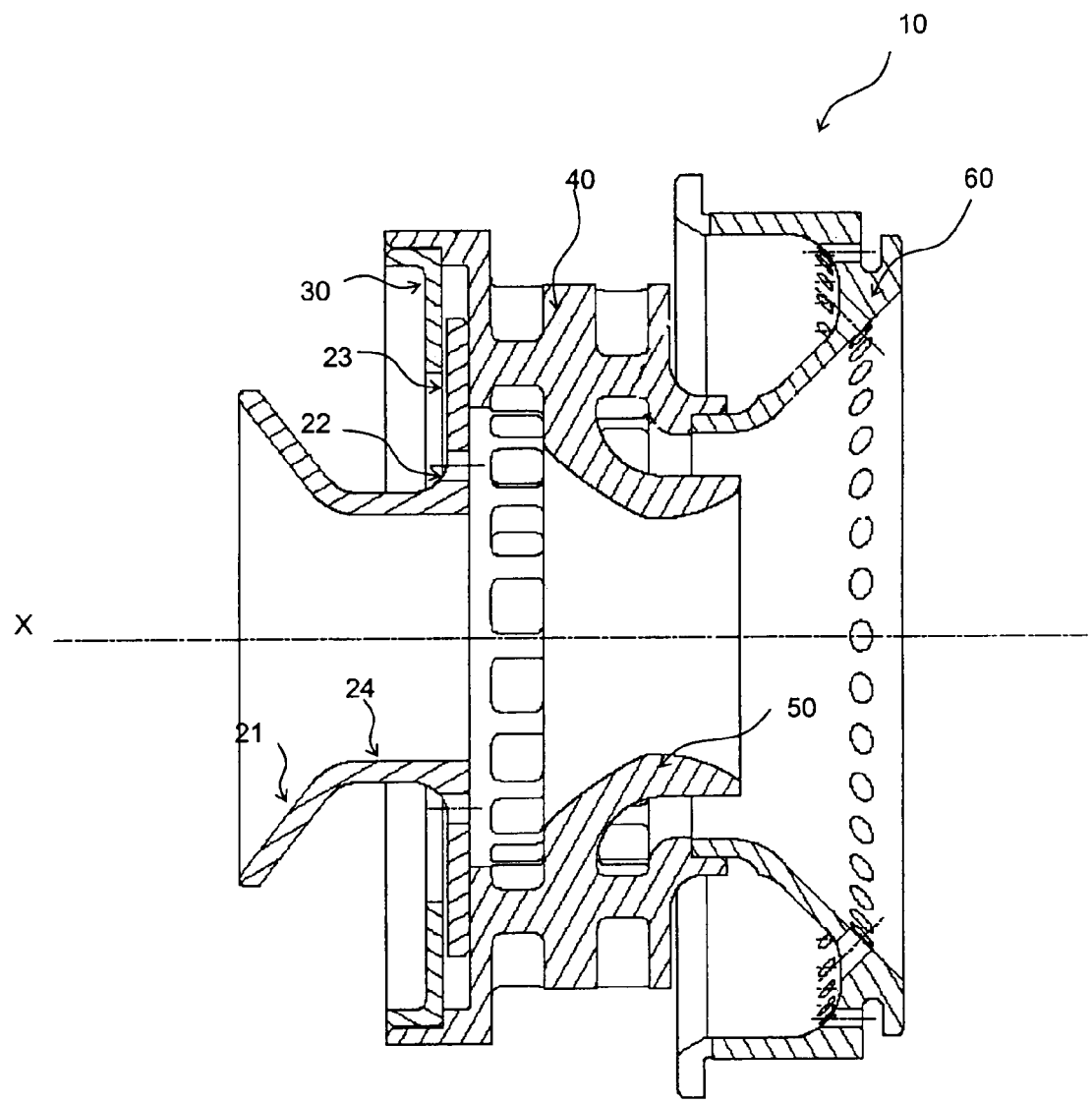
FIG. 2 is a schematic sectioned view of an injection device according to the prior art.

FIG. 1 and FIG. 2, already described, show, in section, a combustion chamber and an injection device according to the prior art.

DESCRIPTION OF THE PREFERRED EMBODIMENTS

Figure 3:
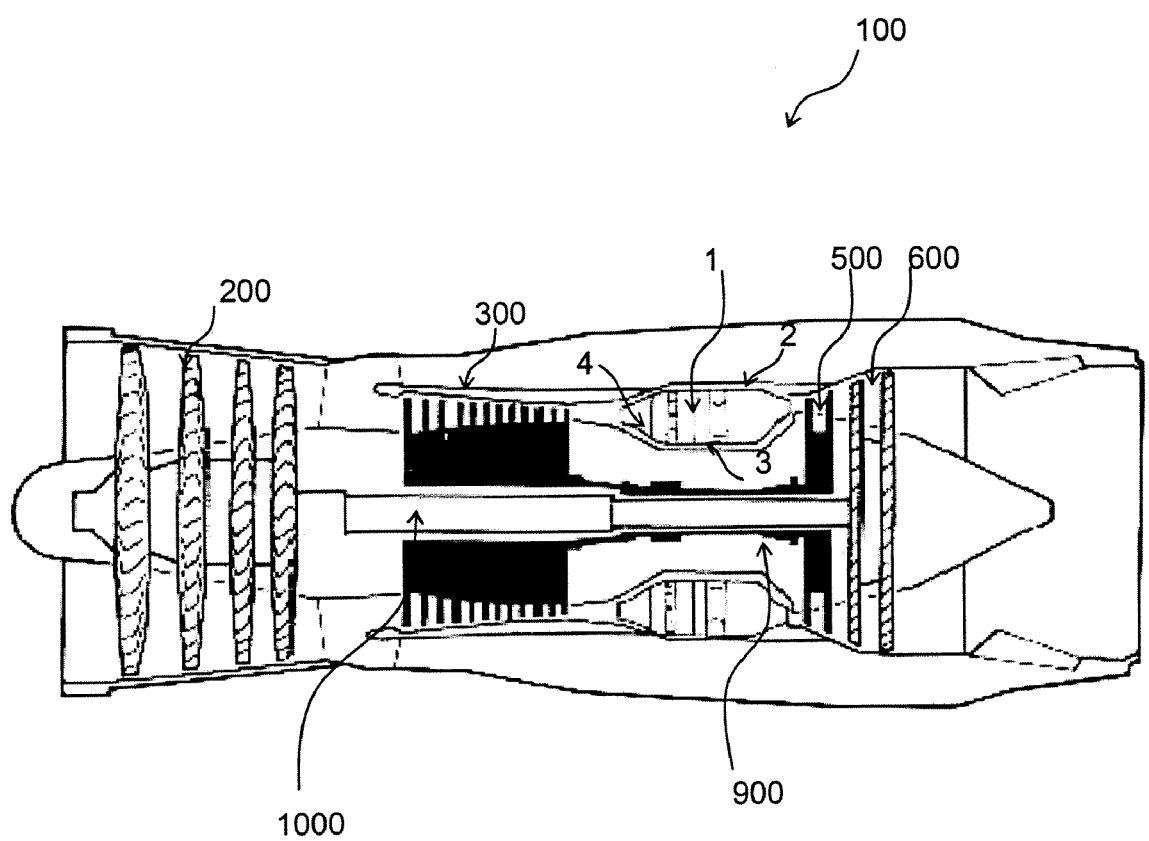
FIG. 3 is a schematic sectioned view of a turbomachine and, more specifically, of an aircraft jet engine.

FIG. 3 shows, in section, an overall view of a turbomachine 100, for example an aircraft jet engine, comprising a low-pressure compressor 200, a high-pressure compressor 300, a combustion chamber 1, a low-pressure turbine 500 and a high-pressure turbine 600. The combustion gases flow in the downstream direction in the combustion chamber 1 and thereafter feed into the turbines 500 and 600 which respectively drive the compressors 200 and 300 positioned upstream of the chamber endwall 4, via two shafts 900 and 1000 respectively. The high-pressure compressor 300 supplies air to the injection devices together with two annular spaces positioned radially inside and outside the combustion chamber 1 respectively. The air introduced into the combustion chamber 1 contributes toward vaporizing the fuel and burning it. The air flowing on the outside of the walls of the combustion chamber 2 contributes toward cooling its walls and enters the chamber via dilution holes (not depicted) so as to cool the combustion gases forwarded to the turbine.

Figure 4:
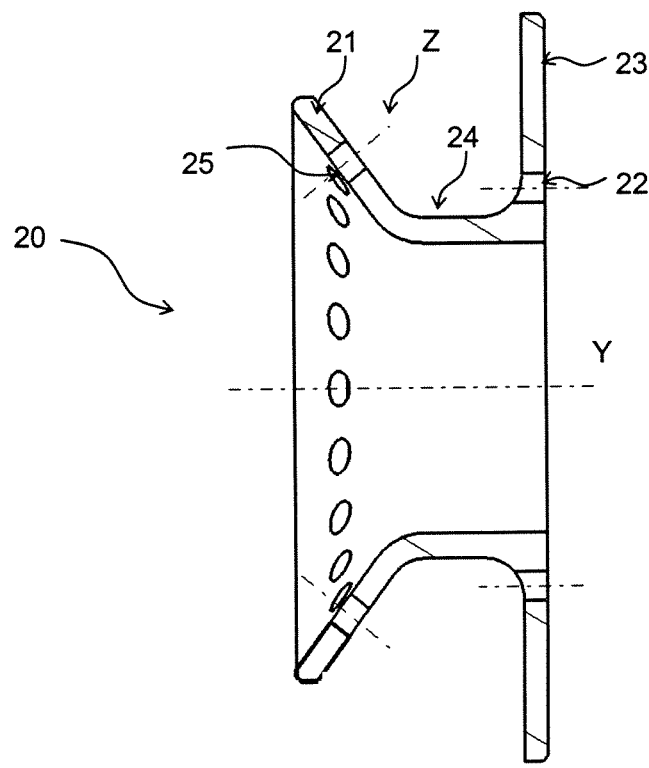
FIG. 4 is a schematic sectioned view of a sliding bushing according to the invention.
Figure 5:
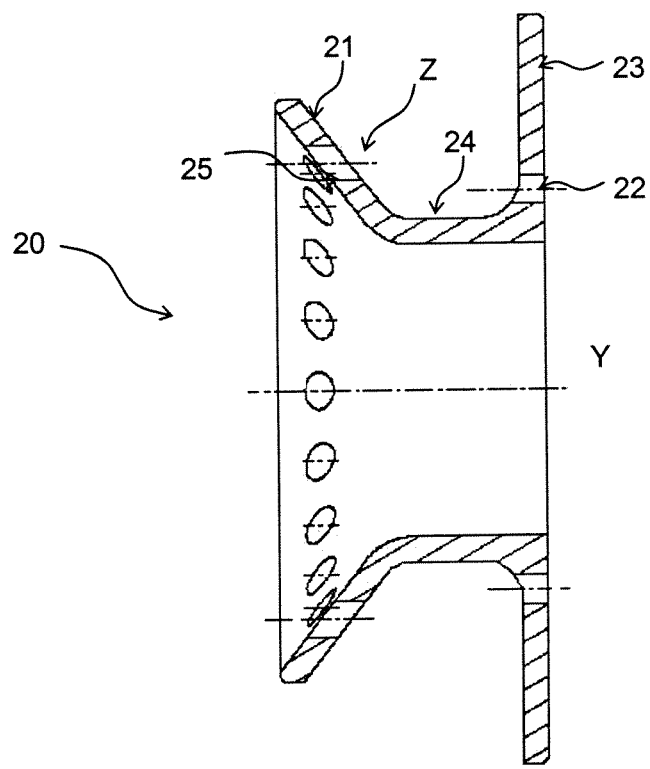
FIG. 5 is a schematic sectioned view of a second embodiment of a sliding bushing according to the invention.

FIG. 4 shows, in section, an exemplary embodiment of a sliding bushing 20 of an injection device 10 according to the invention. The sliding bushing 20 is made up of a convergent conical upstream wall 21 continuing downstream in the form of a cylindrical wall 24, the axis Y of which is parallel to the axis of symmetry of the injection device. The cylindrical wall 24 terminates in a flange 23 extending radially outwards. The flange 23 is equipped with purge holes 22 preferably positioned in its part closest to the cylindrical wall 24 so as not to be obstructed, even partially, by the radial swirl inducers 40 should there be any relative movement between the sliding bushing 20 and the injection device 10. Additional orifices 25 for supplying the purge holes with pressurized air are made on the convergent upstream wall 21 of the sliding bushing 20. In the example described here, the convergent upstream wall 21 is equipped with just one row of circumferentially spaced additional supply orifices 25, but several rows of orifices could be produced. The axis Z of these additional orifices 25 may be orthogonal to the wall of the convergent upstream wall 21, as illustrated in FIG. 4. It may also be parallel to the axis Y as illustrated in FIG. 5 or alternatively form any angle with the convergent upstream wall 21.

Thus, the purge holes 22 are no longer supplied with pressurized air that has to flow around the convergent upstream wall 21 of the sliding bushing 20 but are supplied directly with air from the additional supply orifices 25. This makes it possible to do away with the pressure drops due to flow around the upstream wall 21. In order for this type of supply to the purge holes 22 to be effective, the total passage cross section for the air at the additional supply orifices 25 needs to be greater than or equal to the total passage cross section for the air in the purge holes. The total passage cross section of the additional supply orifices 25 corresponds to the passage cross-sectional area of one orifice multiplied by the number of orifices. The same holds true for the passage cross section of the purge holes 22. This being the case, the purge holes 22 are supplied with air at a higher pressure making it possible, for the same purge hole geometry and the same number of purge holes as in the prior art, to pass a higher flow rate of air through these holes.

At the same time, if the desired flow rate remains the same as in the prior art, the use of additional supply orifices 25 allows the use of purge holes 22 of a smaller diameter than in the prior art, thus making it possible to achieve a corresponding reduction in the inside diameter of the flange 23 and therefore to reduce the size of the radial swirl inducers 40 and therefore achieve a more compact injection device.

The higher the cross section of the additional supply orifices, the greater will be the tolerance on irregularities in shape and roughness of the purge holes 22, and this will allow manufacturing costs to be lowered.

Although the additional supply orifices 25 are made on the convergent upstream wall 21 of the sliding bushing, inasmuch as the total passage cross section for air at these orifices is maintained, the supply to the purge holes 22 is now no longer dependent on the geometry of the sliding bushing, particularly of the convergent upstream wall.

The number of additional supply orifices 25 may be equal to or different from the number of purge holes 22, the important factor being the total passage cross section.

Figure 6:
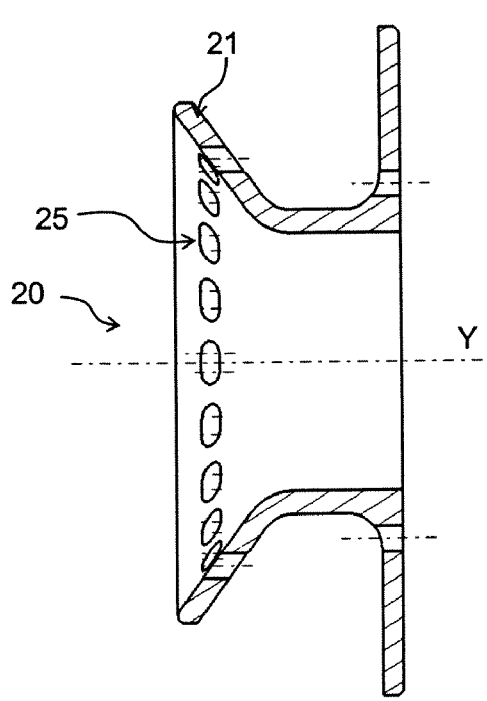
FIG. 6 is a schematic sectioned view of a third embodiment of a sliding bushing according to the invention.
Figure 7:
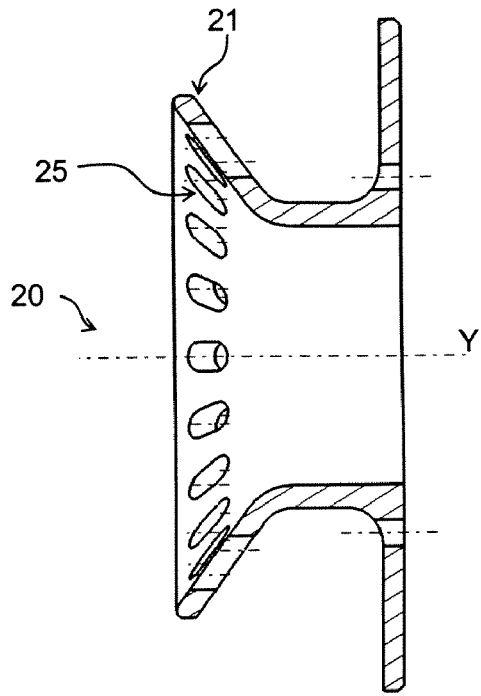
FIG. 7 is a schematic sectioned view of a fourth embodiment of a sliding bushing according to the invention.
Figure 8:
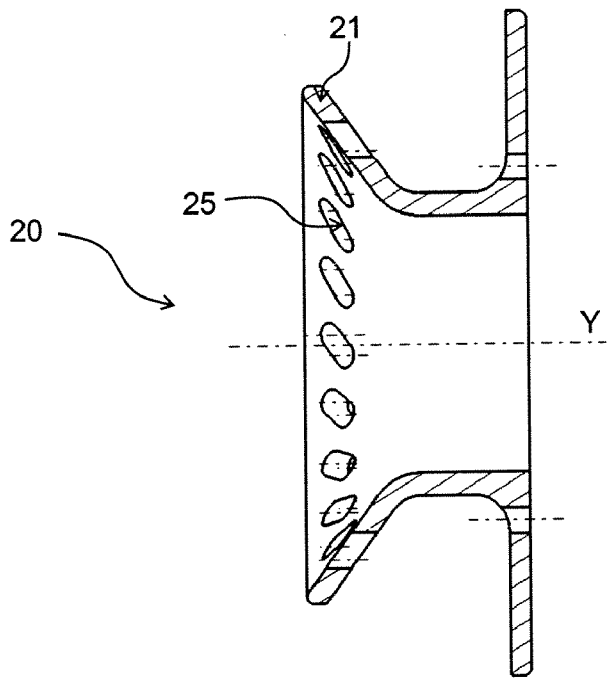
FIG. 8 is a schematic sectioned view of a fifth embodiment of a sliding bushing according to the invention.
Figure 9:
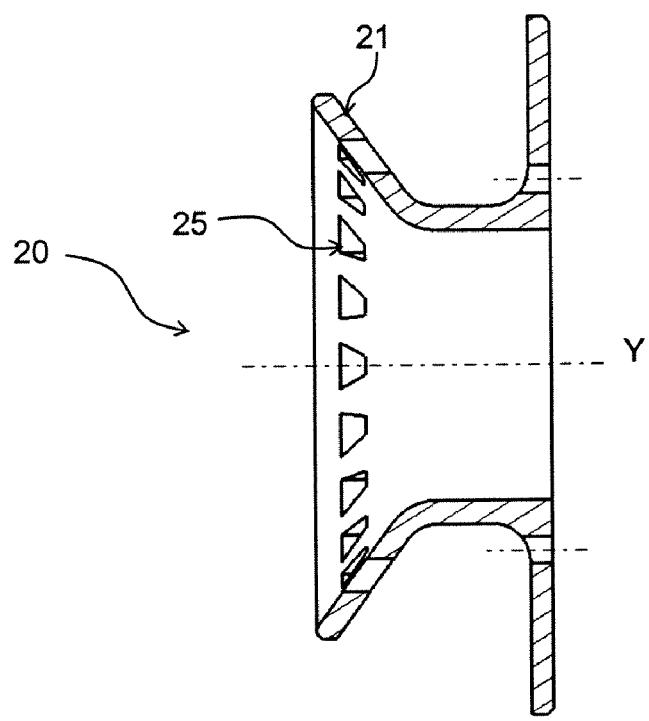
FIG. 9 is a schematic sectioned view of a sixth embodiment of a sliding bushing according to the invention.

Furthermore, the additional supply orifices 25 may be circular in shape, as illustrated in FIGS. 4 and 5, or alternatively oblong, parallelepipedal or trapezoidal, as illustrated in FIGS. 6 to 9. In the case of an oblong shape, the major length of the orifices 25 may be positioned along the circumference of the convergent upstream wall 21 as illustrated in FIG. 6. It may also be positioned parallel to the axis Y of the sliding bushing 20 as illustrated in FIG. 7, or at any angle ranging between these two positions, as illustrated in FIG. 8.

Figure 10:
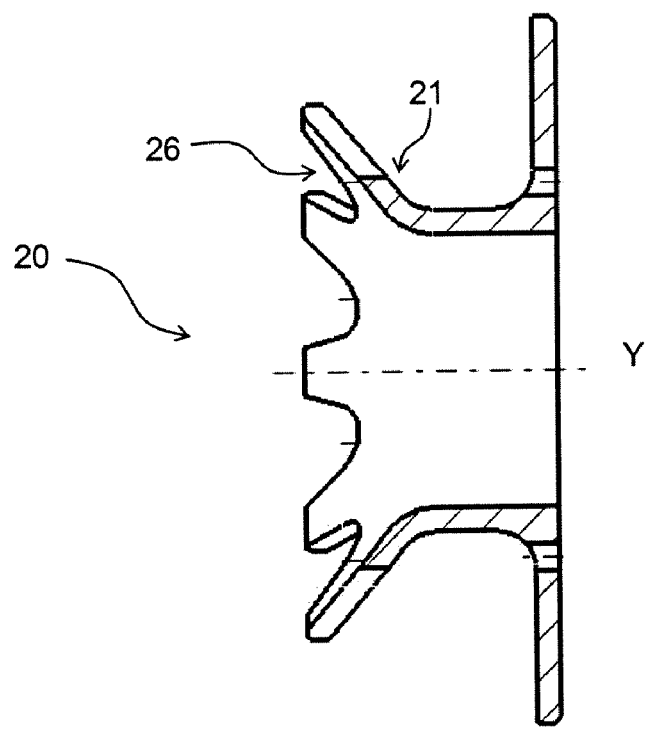
FIG. 10 is a schematic sectioned view of a first embodiment variant of a sliding bushing according to the invention.

According to another embodiment of the invention, illustrated in FIG. 10, the additional supply orifices 25 may be positioned at the upstream end of the convergent wall 21, produced in such a way that they have open sides and thus form scallops 28. The scallops 28 have the advantage of being more simple to manufacture because, when the sliding bushing 20 is obtained using a casting method, the scallops 28 can be obtained directly in the casting, without requiring special machining.

Figure 11:
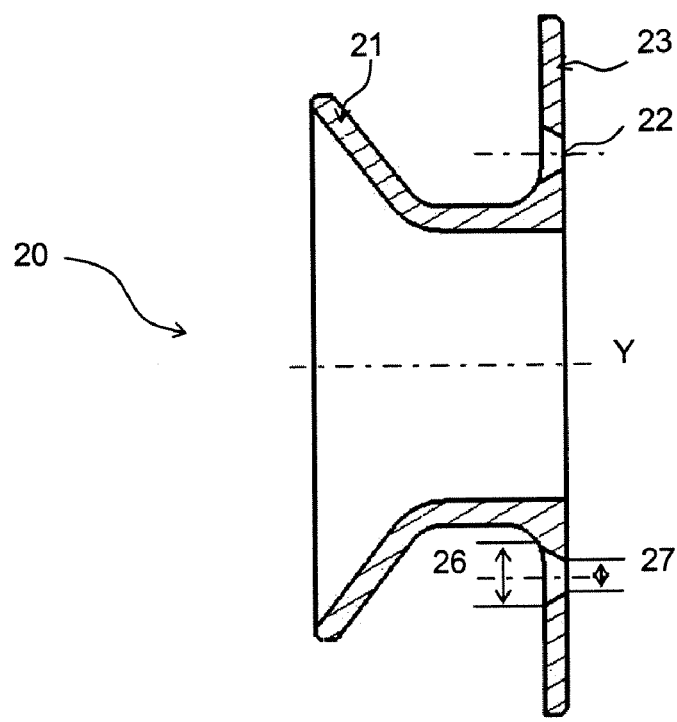
FIG. 11 is a schematic sectioned view of a second embodiment variant of a sliding bushing according to the invention.

According to a variant of the invention, the increase in pressure needed to increase the amount of air passing through the purge holes 22 can be obtained by altering the geometry of the purge holes 22. FIG. 11 shows a sectioned view of a sliding bushing 20 in which the purge holes 22 are conical, their inlet diameter 26 being larger than their outlet diameter 27. Thus, as the flow rate remains constant throughout the length of the purge holes 22, the air is accelerated and the amount of air passing through the purge holes 22 in a given space of time is higher.

Figure 12:
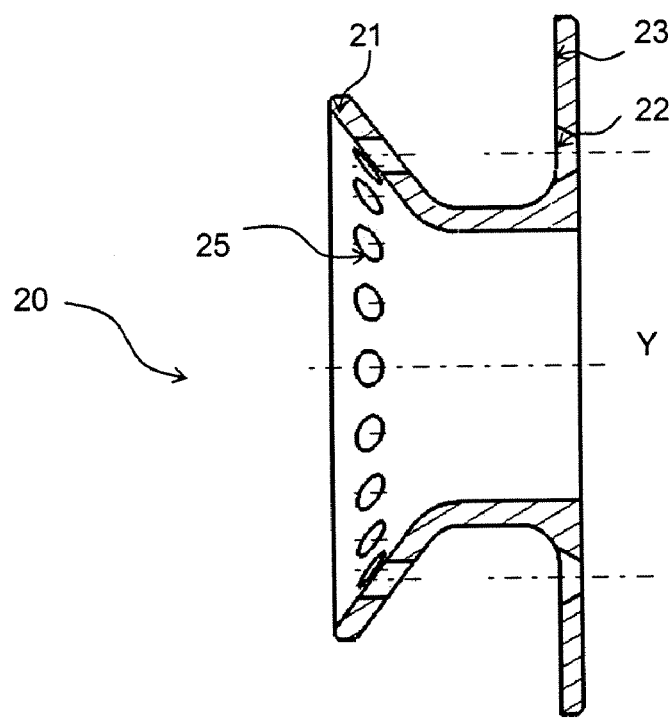
FIG. 12 is a schematic sectioned view of a combination of two embodiment variants of a sliding bushing according to the invention.

It is of course possible to mix the variants of the invention by combining the effects associated with the addition of additional supply orifices 25, or scallops 28, and the effects associated with the use of conical purge holes 22. An example of such a combination is illustrated in FIG. 12.

By way of example, three-dimensional numerical simulations have established that, for a sliding bushing equipped with 14 purge holes 1.4 mm in diameter, arranging 20 circular additional supply orifices as described in FIG. 4, with a diameter of 1.8 mm, yields a 15% increase in the air flow rate passing through the purge holes 22.

The invention claimed is:

1. A device for injecting a mixture of air and fuel into a combustion chamber of a turbomachine, the injection device having symmetry of revolution about an axis and comprising, arranged from upstream to downstream in the direction in which the gases flow, a sliding bushing of axis of revolution Y connected to radial swirl inducers by a dish, an aerodynamic bowl spaced axially from the radial swirl inducers, the sliding bushing comprising a convergent conical upstream wall continuing into a cylindrical wall of axis X and a downstream flange extending radially at the downstream end of the cylindrical wall, the downstream flange being equipped with pressurized-air supply holes also known as purge holes, wherein the convergent upstream wall of the sliding bushing is equipped with at least one row of circumferentially-spaced additional pressurized-air supply orifices.

2. The injection device as claimed in claim 1, wherein the additional supply orifices have a total passage cross section greater than or equal to the total passage cross section of the purge holes.

3. The injection device as claimed in one of claims 1 and 2, wherein the additional supply orifices are of cylindrical shape with a directrix that is circular in shape.

4. The injection device as claimed in one of claims 1 and 2, wherein the additional supply orifices are of cylindrical shape with a directrix that is oblong in shape.

5. The injection device as claimed in one of claims 1 and 2, wherein the additional supply orifices are of cylindrical shape with a directrix that is shaped as a quadrilateral.

6. The injection device as claimed in claim 1, wherein the additional supply orifices have their axis parallel to the axis of the sliding bushing.

7. The injection device as claimed in claim 1, wherein the additional supply orifices have their axis orthogonal to the convergent conical upstream wall.

8. The injection device as claimed in any one of claims 1 and 2, wherein the additional supply orifices are positioned at the upstream end of the convergent upstream wall, have an open side and form scallops.

9. The injection device as claimed in claim 1, wherein the purge holes have different inlet and outlet diameters, the inlet diameter being greater than the outlet diameter.

10. A combustion chamber comprising an internal wall, an external wall, a chamber endwall and which is equipped with at least one injection device as claimed in claim 1.

11. A turbomachine equipped with a combustion chamber as claimed in claim 10.

* * * * *